US010362020B2

(12) United States Patent
Zhou

(10) Patent No.: US 10,362,020 B2
(45) Date of Patent: Jul. 23, 2019

(54) PROCESSING AND VERIFYING DIGITAL CERTIFICATE

(71) Applicant: Alibaba Group Holding Limited, Grand Cayman (KY)

(72) Inventor: Zhizhang Zhou, Hangzhou (CN)

(73) Assignee: Alibaba Group Holding Limited, Caymon Islands (KY)

(*) Notice: Subject to any disclaimer, the term of this patent is extended or adjusted under 35 U.S.C. 154(b) by 0 days.

(21) Appl. No.: 14/721,484

(22) Filed: May 26, 2015

(65) Prior Publication Data
US 2015/0341353 A1  Nov. 26, 2015

(30) Foreign Application Priority Data

May 26, 2014  (CN) .......................... 2014 1 0225581

(51) Int. Cl.
H04L 29/06         (2006.01)
H04L 9/32          (2006.01)
(Continued)

(52) U.S. Cl.
CPC .......... H04L 63/0823 (2013.01); G06F 21/33 (2013.01); H04L 9/3239 (2013.01);
(Continued)

(58) Field of Classification Search
CPC . H04L 63/0876; H04L 9/3268; H04L 9/3239; H04L 63/0823; H04L 67/2842; G06F 21/00
See application file for complete search history.

(56) References Cited

U.S. PATENT DOCUMENTS 7,073,055 B1    7/2006  Freed et al.
9,332,002 B1*   5/2016  Bowen ............... H04L 63/0823
(Continued)

FOREIGN PATENT DOCUMENTS

CN    101437228 A    5/2009
CN    102024102 A    4/2011
(Continued)

OTHER PUBLICATIONS

Pietro Albano, "On the Construction of a False Digital Alibi on the Android OS," IEEE Computer Society, 2011, pp. 685-690 (Year: 2011).*
(Continued)

*Primary Examiner* — Luu T Pham
*Assistant Examiner* — Canh Le
(74) *Attorney, Agent, or Firm* — Lee & Hayes, P.C.

(57) ABSTRACT

A digital certificate of a user is collected. A digest computation of a collecting result of the digital certificate is performed to generate a digital certificate digest of the user. The digital certificate digest is cached. In response to an operation of the user, a service request containing the cached digital certificate digest is transmitted to a service server such that when a service corresponding to the service request is a service for which the digital certificate needs to be verified, the service server executes the service when the verification passes through verification of the digital certificate digest. The techniques of the present disclosure execute the verification operation of the digital certificate along with specific service operations, which reduce the number of certificate verifications and the number of requests for executing the specific service.

9 Claims, 6 Drawing Sheets

(51) Int. Cl.
  *G06F 21/33* (2013.01)
  *H04L 29/08* (2006.01)
(52) U.S. Cl.
  CPC ............ *H04L 9/3268* (2013.01); *H04L 63/08* (2013.01); *H04L 67/02* (2013.01); *H04L 67/2842* (2013.01)

(56) References Cited

U.S. PATENT DOCUMENTS

| | | | |
|---|---|---|---|
| 2004/0030887 | A1 | 2/2004 | Harrisville-Wolff et al. |
| 2005/0114666 | A1* | 5/2005 | Sudia .................... H04L 9/3236 713/175 |
| 2007/0118892 | A1* | 5/2007 | Sastry ................ H04L 63/0823 726/10 |
| 2008/0046739 | A1 | 2/2008 | Adams et al. |
| 2008/0235516 | A1* | 9/2008 | Raghunath ......... G07C 9/00309 713/186 |
| 2009/0222902 | A1 | 9/2009 | Bender et al. |
| 2009/0292599 | A1* | 11/2009 | Rampell ............... G06Q 30/02 705/14.13 |
| 2011/0119747 | A1* | 5/2011 | Lambiase ............. G06F 21/335 726/8 |
| 2011/0126296 | A1* | 5/2011 | Moore ................ H04L 63/0807 726/28 |
| 2011/0238986 | A1 | 9/2011 | Kherani et al. |
| 2013/0145154 | A1* | 6/2013 | Kim .................... H04L 63/0823 713/156 |
| 2013/0283042 | A1* | 10/2013 | Xiao ....................... G06F 21/33 713/156 |
| 2013/0312079 | A1 | 11/2013 | McCallum |
| 2014/0040611 | A1* | 2/2014 | Tenenboym .......... H04L 9/3236 713/157 |
| 2014/0149739 | A1 | 5/2014 | Wood et al. |

FOREIGN PATENT DOCUMENTS

| | | |
|---|---|---|
| CN | 102026180 A | 4/2011 |
| CN | 102202047 A | 9/2011 |
| JP | 2003304240 A | 10/2003 |
| JP | 2005149505 A | 6/2005 |
| JP | 2006512853 A | 4/2006 |
| JP | 2006120148 A | 5/2006 |
| JP | 2007274403 A | 10/2007 |
| JP | 2008079091 A | 4/2008 |
| JP | 2010283575 A | 12/2010 |
| WO | WO2011055486 A | 5/2011 |

OTHER PUBLICATIONS

Michael Kasavana, "Generating an Online Bottom Line," Jan. 1998, pp. 63-75. (Year: 1998).*
PCT Search Report and Written Opinion dated Aug. 25, 2015 for PCT Application No. PCT/US15/32396, 9 pages.
The Extended European Search Report dated Dec. 12, 2017 for European Patent Application No. 15799786.7, 7 pages.
Translated Chinese Office Action for Chinese Patent Application No. 201410225581.9, dated Dec. 26, 2017, a counterpart foreign application of U.S. Appl. No. 14/721,484, 8 pages.
Translated Chinese Office Action for Chinese Patent Application No. 201410225581.9, dated Jul. 12, 2018, a counterpart foreign application of U.S. Appl. No. 14/721,484, 8 pages.
Translated Chinese Search Report for Chinese Patent Application No. 201410225581.9, dated Dec. 18, 2017, a counterpart foreign application of U.S. Appl. No. 14/721,484, 2 pages.
Translated Chinese Search Report for Chinese Patent Application No. 201410225581.9, dated Jul. 4, 2018, a counterpart foreign application of U.S. Appl. No. 14/721,484, 2 pages.
The Extended European Search Report dated Jan. 17, 2018 for European Patent Application No. 15799786.7, 7 pages.
The Japanese Office Action dated Mar. 12, 2019 for Japanese Patent Application No. 2016-566252, a counterpart of U.S. Appl. No. 14/721,484, 6 pages.

* cited by examiner

PROCESSING AND VERIFYING DIGITAL CERTIFICATE

CROSS REFERENCE TO RELATED PATENT APPLICATION

This application claims foreign priority to Chinese Patent Application No. 201410225581.9 filed on May 26, 2014, entitled "Method and Apparatus for Processing and Validating Digital Certificate," which is hereby incorporated by reference in its entirety.

TECHNICAL FIELD

The present disclosure relates to the technical field of the Internet, and, more particularly, to a method and an apparatus for processing and verifying a digital certificate.

BACKGROUND

At present, many websites that have high security requirements require users to use digital certificate products. According to a storage mode, the digital certificates may be classified into two types. One type is a digital certificate stored in hardware medium, such as USB Key, often referred to as a "hard certificate"; the other type is a digital certificate stored (installed) on a local client (such as desktop computer and notebook computer), often referred to as a "soft certificate." With respect to an operation which has a high security requirement, a second verification is usually performed by adopting a digital certificate to guarantee the security of the user operation. However, as a digital certificate which is installed on the local client while the verification and processing logic of the certificate is located on the server side, before the execution of the operation which has a high security requirement, it is necessary to collect the certificate which is installed on the local client and then submit it to the server side for a certificate match verification. In such a mode, a great amount of data will be transmitted in the network, which causes a network traffic waste, and a certificate collection and submission step has to be added prior to each operation with high security requirement.

With regard to such problem, the existing solution is to collect and submit a certificate after a user logs in, then verify the certificate, and cache the verification result, as specifically shown in FIG. 1. FIG. 1 is a schematic diagram of an interaction between a browser and a corresponding server under the existing digital certificate verification solution. Since the digital certification verification needs to be carried out, the operations which need to be performed to complete the user's login include the following: requesting to log in at step 110, collecting certificate information at step 120, submitting the certificate information at step 130, verifying the certificate and caching the certificate verification result at step 140, initiating a corresponding service request in response to a user operation at step 150, and executing a service at step 160.

The existing solution shown in FIG. 1 has the following apparent defects: 1) the client terminal has to perform a certification collection and submission operation each time the user logs in, and if only 20% of users need to carry out a certificate verification to perform an operations with a high security requirement, this means that 80% of the certificate submission and verification operation are wasted; and 2) since the volume of digital certificates is relatively large, when the collected certificate content is submitted to a server for verification, generally the certificate will be placed in a format of form items and submitted to the server in a POST mode.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides methods and apparatuses for processing and verification of a digital certificate to solve the problems of waste of certificate submission and verification operations and large volumes of digital certificates in the prior art.

The present disclosure provides an example method for processing a digital certificate. A digital certificate of a user is collected. A digest computation of a collecting result of the digital certificate is performed to generate a digital certificate digest of the user. The digital certificate digest is cached. In response to an operation of the user, a service request containing the cached digital certificate digest is transmitted to a service server such that when a service corresponding to the service request is a service for which the digital certificate needs to be verified, the service server executes the service when the verification passes through verification of the digital certificate digest.

The present disclosure provides an example apparatus for processing a digital certificate. The apparatus may include the following modules. A collecting module collects a digital certificate of a user. A digesting module conducts a digest computation of a collecting result of the digital certificate to generate a digital certificate digest of the user. A caching module caches the digital certificate digest. A transmitting module, in response to an operation of the user, transmits a service request containing the cached digital certificate digest to a service server. When a service corresponding to the service request is a service for which the digital certificate needs to be verified, the service server executes the service when the verification passes through verification of the digital certificate digest.

The present disclosure also provides an example method for verifying a digital certificate. A client terminal collects a digital certificate of a user, conducts a digest computation of a collecting result of the digital certificate to generate a digital certificate digest of the user, caches the digital certificate digest, and, in response to an operation of the user, transmits a service request containing the cached digital certificate digest to a service server. The service server receives the service request. When a service corresponding to the service request is a service for which the digital certificate needs to be verified, the service server verifies the digital certificate digest.

The present disclosure further provides an example system for verifying a digital certificate. The system may include a client terminal and a service server. The client terminal includes the following modules. A collecting module collects a digital certificate of a user. A digesting module conducts a digest computation of a collecting result of the digital certificate to generate a digital certificate digest of the user. A caching module caches the digital certificate digest.

A transmitting module, in response to an operation of the user, transmits a service request containing the cached digital certificate digest to a service server. The service server may include the following modules. A receiving module receives the service request. A verifying module, when a service corresponding to the service request is a service for which the digital certificate needs to be verified, verifies the digital certificate digest.

Compared with the existing technology, the technical solutions according to the present disclosure have at least the following beneficial technical effects:
1) The verification operation of the digital certificate and the specific service operation are executed together, which reduces a number of certificate verifications.
2) It is not necessary to submit the certificate information through a POST page, which reduces a number of requests for executing the specific service.
3) The digital certificate is cached, which enables the certificate digest to be attached with each operation performed by the user after the user logs in, such that the certificate verification may be performed anytime if necessary.

BRIEF DESCRIPTION OF THE DRAWINGS

The drawings described herein are used to provide a further understanding of the present disclosure and constitute a part of the present disclosure. The example embodiments of the present disclosure and the description thereof are used to illustrate the present disclosure, and do not constitute an improper limitation on the present disclosure.

DETAILED DESCRIPTION

The techniques of the present disclosure conduct a digest computation of a collecting result of a digital certificate and cache a digital certificate digest generated by the computation, such that a browser will transmit a request carrying the digital certificate digest to a corresponding server each time the user performs an operation. Thus when the operation of the user is an operation for which the digital certificate verification needs to be performed, the server collects the digital certificate digest and conducts the digital certificate verification.

In order to make the purpose, technical solutions and advantages of the present disclosure clear, the technical solutions of the present disclosure are described below by reference to the example embodiments and corresponding FIGS. of the present disclosure. Obviously, the described embodiments are merely part of the embodiments of the present disclosure rather than all of the embodiments. All other embodiments obtained by one of ordinary skill in the art based on the embodiments of the present disclosure without using any creative effort shall belong to the protection scope of the present disclosure.

According to the example embodiment of the present disclosure, a method for processing a digital certificate is provided.

Figure 2:
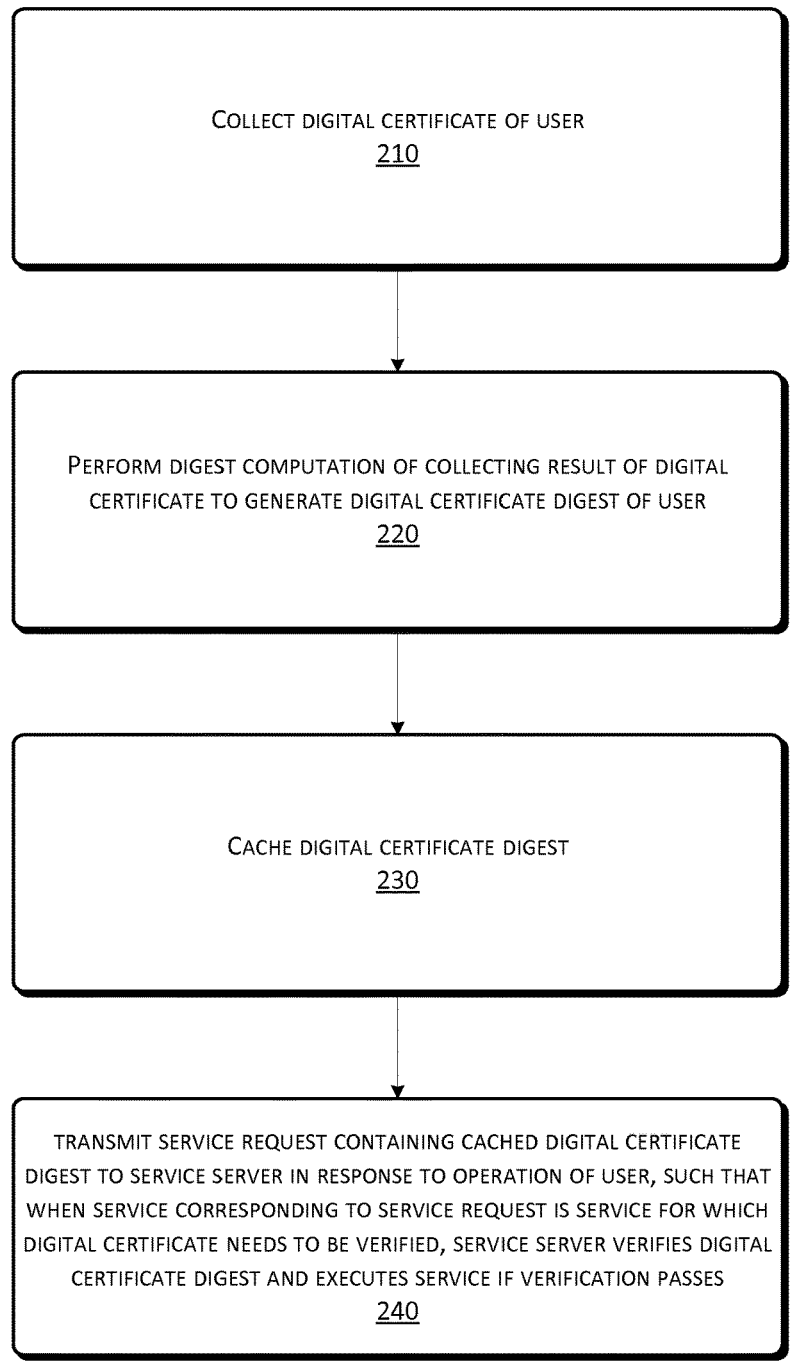
FIG. 2 is a flowchart of an example method for processing a digital certificate according to an example embodiment of the present disclosure.

FIG. 2 illustrates an example method for processing a digital certificate according to an example embodiment of the present disclosure. The technical solution of the present disclosure may be applied to a website or webpage application (such as data interaction application) which has a high security requirement to conduct a verification of a digital certificate of a user. For example, when a webpage application is used via a browser, a digital certificate verification for a particular operation by the user is performed, i.e., a verification on a digital certificate of a user.

At 210, a digital certificate of a user is collected.

For example, when a user visits a website through a browser at a client terminal (such as a desktop computer, a laptop computer, etc.), the digital certificate installed on the local client is collected through a browser control.

According to an example embodiment of the present disclosure, when the user conducts a login operation, a login request is transmitted to a login server. The login server and a service server may be the same server or different servers.

At 220, a digest computation of a collecting result of the digital certificate is performed to generate a digital certificate digest of the user. In other words, the digest computation is performed on the collecting result of the digital certificate by using a particular digest algorithm to generate the digital certificate digest of the user.

Through the digest computation, a larger volume of the digital certificate content is calculated into smaller content. For example, the collecting result of the digital certificate may be calculated as a message digest with a fixed length (such as a character string with a fixed length), i.e., the digital certificate digest, by using a MD5 (Message-Digest Algorithm 5) algorithm.

It should be noted that the present disclosure is not limited thereto, and any digest algorithm which is applicable to the present disclosure may be adopted to conduct a digest computation of the collecting result of the digital certificate. For example, in addition to the MD5 algorithm, algorithms such as SHA (Secure Hash Algorithm) may be adopted as well.

At 230, the digital certificate digest is cached. For example, the generated digital certificate digest may be cached in a cookie file.

At 240, in response to an operation of the user, a service request containing the cached digital certificate digest is transmitted to a service server. When a service corresponding to the service request is a service for which the digital certificate needs to be verified, the service server verifies the digital certificate digest and executes the service when the verification passes.

For example, with respect to each operation performed by the user on the webpage through the browser, the browser will, in response to the operation of the user, transmit the service request corresponding to the operation to the server. The browser may put the generated digital certificate digest of the user in the request and transmit them together to the service server. Since each request of the browser may be transmitted along with cookie, the generated digital certificate digest may be cached in the cookie file. When the browser, in response to the operation of the user, transmits the service request corresponding to the operation to the server, the cookie containing the digital certificate digest and the service request may be transmitted to the service server together. When the service server receives the service request, it may determine whether the service corresponding to the service request is the service for which the digital certificate needs to be verified or not. If the service corresponding to the service request is not a service for which the digital certificate needs to be verified, the service server may execute the service directly. If the service corresponding to the service request is a service (such as payment, transfer and withdrawal of payment application) with a high security requirement and for which the digital certificate needs to be verified, the service server may collect the digital certificate digest of the user to conduct a verification to determine whether the service may be executed or not. If the verification passes, the service server executes the service; and if the verification fails, a relevant prompt message is returned.

The service server may verify the digital certificate digest according to the following operations. A digest computation of the digital certificate of the user stored in the service server is performed by using the digest algorithm adopted to generate the digital certificate digest. A result from the digest computation is compared with the digital certificate digest. If they are the same, the verification is determined to pass. If there is a difference, the verification is determined to fail. For example, if the algorithm adopted to generate the digital certificate digest of the user is the MD5, the digest computation is performed on the digital certificate by using the MD5 algorithm and then the result of the digest computation is compared with the digital certificate digest of the user obtained from the request. If they are the same, the verification is determined to passes. If there is a difference, the verification is determined to fail.

According to the example embodiments of the present disclosure, the digital certificate installed on the local client may also be collected when the user conducts the login operation (i.e., the user logs in the website by using an account and a password). In other words, operations at 210 may be executed when the user logs in and then operations from 220 to 240 may be executed sequentially.

For example, when the user logs in a website or webpage application through the browser on the client terminal, the browser may transmit a login request to a login server of the website. The login server, upon the receipt of the request, may return a script to the browser when the operation such as user account and password verification is performed and the login operation of the user is executed. The browser may execute the script to collect the digital certificate of the user, generate the digital certificate digest, and cache the generated digital certificate digest. The script may be computer-executable codes written by a scripting language, and the login server may place the script in the webpage data returned to the client terminal and then return it to the browser on the client terminal. The browser, upon the receipt of the webpage data (such as page data after the user is logged in) returned by the service server, will execute the script to collect the digital certificate installed on the client terminal, perform a digest computation on the certificate collecting result to generate a certificate digest, and cache the certificate digest in the cookie. Since the digital certificate digest has already been cached, it is no longer necessary to collect the digital certificate during the login in the future and only the digital certificate digest needs to be read from the cache.

The present disclosure also provides an example method for verifying a digital certificate.

Figure 3:
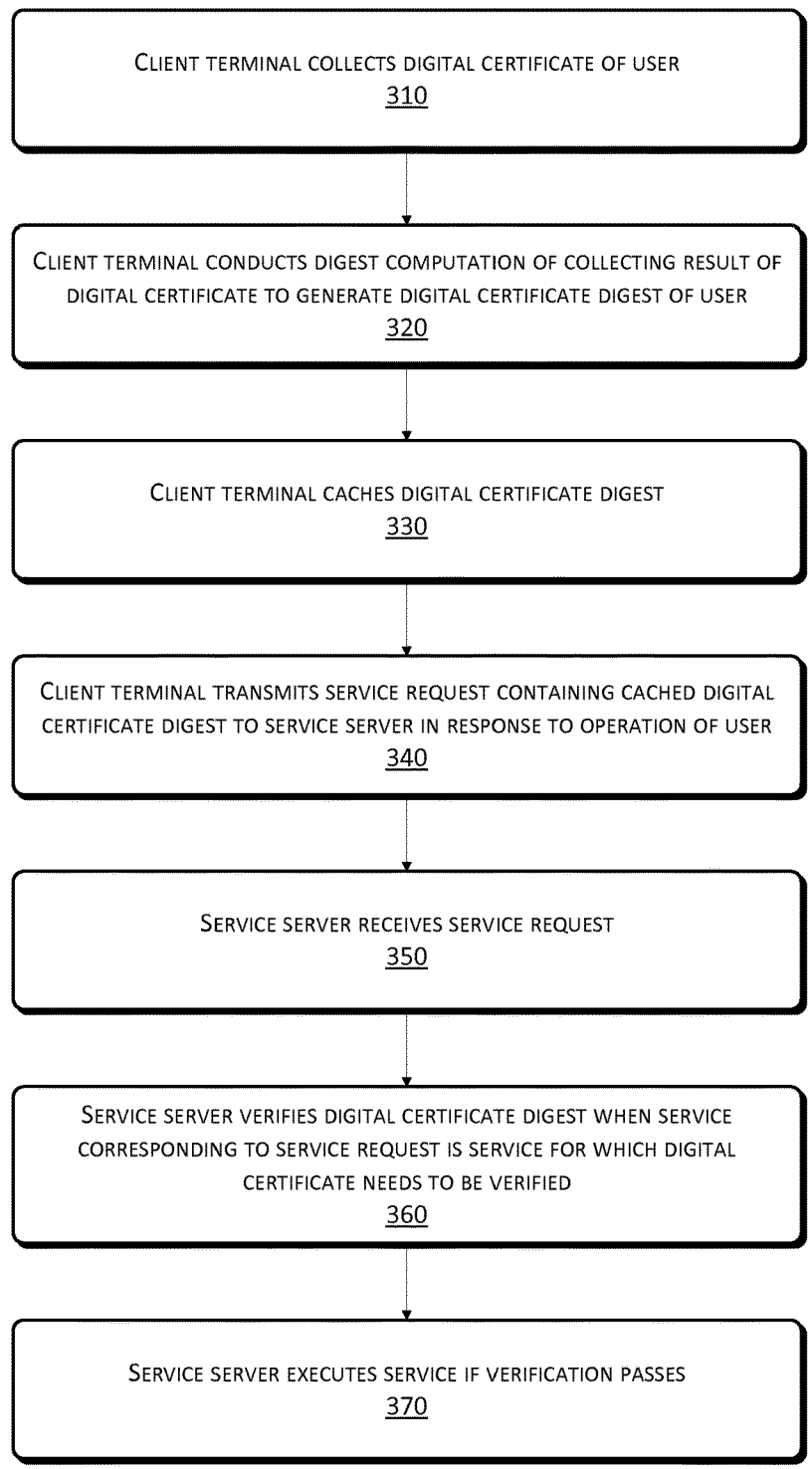
FIG. 3 is a flowchart of an example method for verifying a digital certificate according to an example embodiment of the present disclosure.

FIG. 3 is a flowchart of an example method for verifying a digital certificate according to an embodiment of the present disclosure.

At 310, a client terminal collects a digital certificate of a user.

For example, when the user visits a website through a browser on the client terminal, the digital certificate installed on the local client may be collected through a browser control. The digital certificate installed on the local client may be collected when the user conducts the login operation (i.e., the user logs in the website by using an account and a password).

At 320, the client terminal conducts a digest computation of a collecting result of the digital certificate to generate a digital certificate digest of the user.

For example, the client terminal may conduct a digest computation of the collecting result of the digital certificate by using a particular digest algorithm to generate the digital certificate digest of the user. For instance, the collecting result of the digital certificate may be calculated as a message digest with a fixed length, i.e., the digital certificate digest, by using the MD5 (Message-Digest Algorithm 5) algorithm.

At 330, the client terminal caches the digital certificate digest.

According to the example embodiment of the present disclosure, the generated digital digest may be cached in a cookie file.

At 340, the client terminal, in response to an operation of the user, transmits a service request containing the cached digital certificate digest to a service server.

With respect to each operation performed by the user through the browser, the browser on the client terminal may, in response to the operation of the user, transmit the service request corresponding to the operation to the service server. The browser may place the generated digital certificate digest of the user in the request and transmit them together to the service server. For example, since each request of the browser may be transmitted with cookie, the generated digital certificate digest may be cached in the cookie file. When the browser, in response to the operation of the user, transmits the service request corresponding to the operation to the service server, the cookie containing the digital certificate digest may be placed in the service request and transmitted to the service server together.

At 350, the service server receives the service request.

At 360, when a service corresponding to the service request is a service for which the digital certificate needs to be verified, the service server verifies the digital certificate digest.

For example, when the service server receives the service request, it determines whether the service corresponding to the service request is a service for which the digital certificate needs to be verified or not. If the service corresponding to the service request is not a service for which the digital certificate needs to be verified, the service server may execute the service directly. If the service corresponding to the service request is a service for which the digital certificate needs to be verified, such as a service with a high security requirement, such as payment, transfer and withdrawal, the service server may collect the digital certificate digest of the user from the request (such as the cookie carried by the request) to conduct a verification to determine whether the service may be executed or not.

The service server may verify the digital certificate digest according to the following operations. A digest computation of the digital certificate of the user stored in the service server is performed by using the digest algorithm adopted to generate the digital certificate digest. A result from the digest computation is compared with the digital certificate digest. If they are the same, the verification is determined to pass. If there is a difference, the verification is determined to fail.

At 370, if the verification passes, the server may execute the service; and if the verification of the digital certificate fails, a relevant prompt message may be returned to the client terminal.

Figure 4:
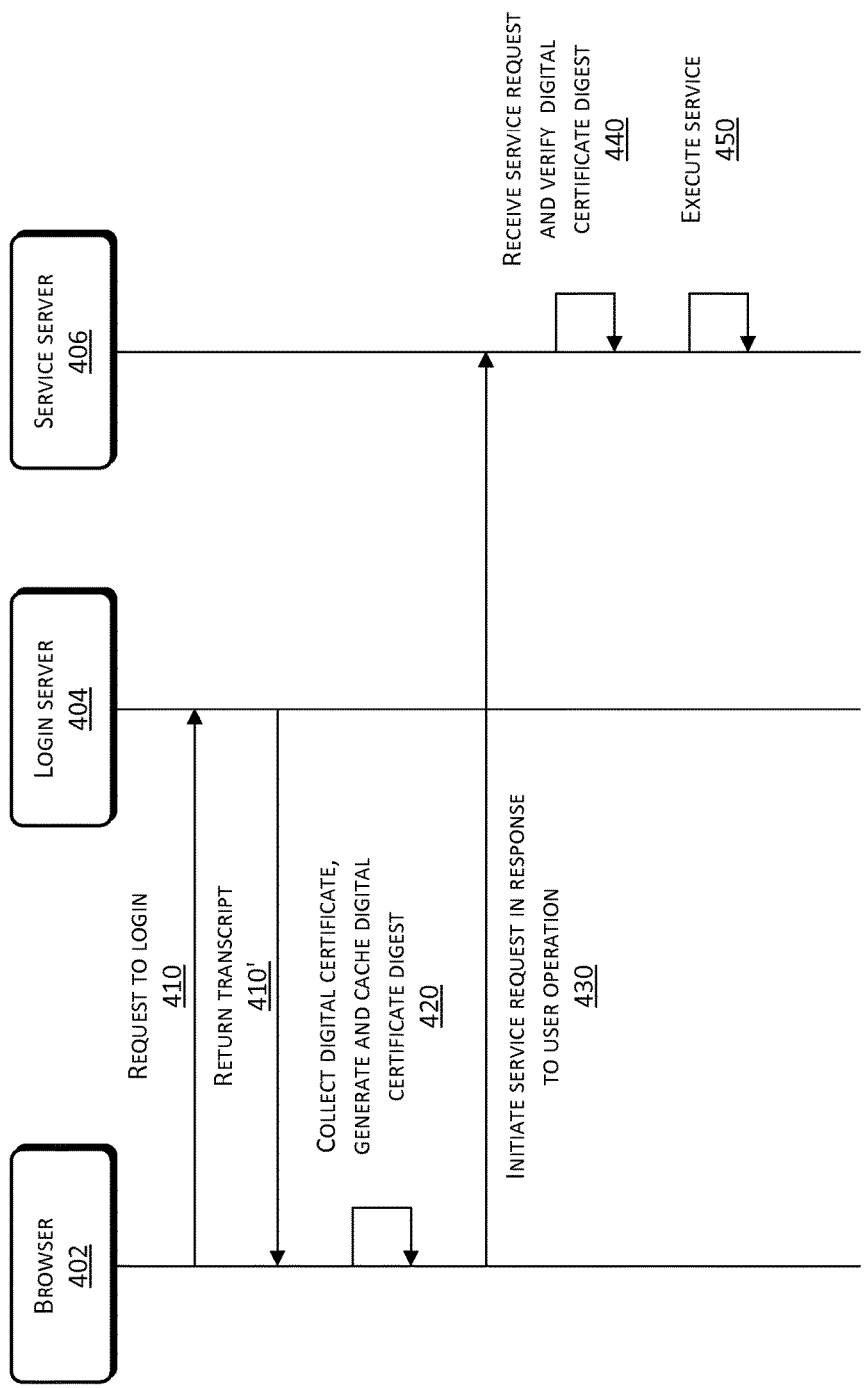
FIG. 4 is a schematic diagram of an interaction between a browser and a server in an example method for verifying a digital certificate according to another example embodiment of the present disclosure.

The method for verifying a digital certificate in the present disclosure will be described below in details by reference to FIG. 4. FIG. 4 is a schematic diagram of an interaction between a browser 402 and a server in an example method for verifying a digital certificate according to another embodiment of the present disclosure. A login server 404 and a service server 406 may be the same server or different servers. They are shown as two servers in FIG. 4. The login server 404 may be a server for executing logging-in for a user, and the service server 406 may be a server for executing specific services.

As shown in FIG. 4, at 410, when the user conducts the login operation, the browser 402 may transmit the login request to the login server 404 to request the login server 404 to execute the login of the user. The login server 404 verifies whether the account, password, and the like of the user are matched or not. If they are matched, the login of the user is executed, and page content after the success login is returned to the browser 402. The browser 402 may carry out a page rendering and display according to the data returned by the login server 404.

At 420, the browser 402 on the client terminal collects the digital certificate installed on the local client, conducts a digest computation of the collecting result of the digital certificate to generate the digital certificate digest, and caches the digital certificate digest. The browser 402 may cache the generated digital certificate digest in the cookie file.

According to the example embodiment of the present disclosure, as shown in FIG. 4, at 410', when the user logs in the website or webpage application through the browser 402 on the client terminal, the browser 402 may transmit the login request to the login server 404 of the website, and the login server 404 may receive the login request and execute the login of the user according to the login request. The login server 404 may further perform operations, such as user account and password verification to execute the login operation of the user when the verification passes and return a script back to the browser 402 on the client terminal. The browser 402 may conduct operations, such as collecting the digital certificate of the user, generating the digital certificate digest and caching the digital certificate digest, by executing the script (refer to 410' in FIG. 4). The script may be computer-executable codes written by a scripting language, and the script may be placed in the webpage data returned to the client terminal and returned to the browser 402 on the client terminal. Upon the receipt of the webpage data (such as page data after the login) returned by the server, the browser 402 executes the script to collect the digital certificate installed on the client terminal, performs a digest computation of the certificate collecting result to generate a certificate digest, and caches the certificate digest in the cookie.

The following is an example of the script for caching the certificate digest according to an example embodiment of the present disclosure:
document.cookie="certDigest="+certDigest At 430, the browser 402 on the client terminal, in response to an operation of the user, transmits a service request containing the cached digital certificate digest to the service server 406. When a service corresponding to the service request is a service for which the digital certificate needs to be verified, the service server 406 verifies the digital certificate digest and executes the service if the verification passes.

According to the example embodiment of the present disclosure, the service server 406 may be a corresponding service server which is used for executing the operation performed by the user. For example, if the operation performed by the user is account transfer, the service server 406 may be a server for executing a transfer service, i.e., a transfer server. If the operation performed by the user is payment, the service server 406 may be a server for executing a payment service, i.e., a payment server. The browser 402 may transmit the service request containing the digital certificate digest to the corresponding service server 406 according to the operation performed by the user, and the service requested by the service request may be a service corresponding to the operation performed by the user. For example, if the operation performed by the user is account transfer, the browser 402 transmits a transfer request to the transfer server and the browser 402 may place the cookie file containing the digital certificate digest of the user in the request and then transmit them together to the transfer server.

At 440, the service server 406 receives the service request. When a service corresponding to the service request is a service for which the digital certificate needs to be verified, the service server 406 verifies the digital certificate digest and executes the service if the verification passes. In other words, when the service server 406 receives the service request, it determines whether the service corresponding to the service request is a service for which the digital certificate needs to the verified or not. If the service corresponding to the service request is not a service for which the digital certificate needs to be verified, the service server may execute the service directly. If the service corresponding to the service request is a service for which the digital certificate needs to be verified, such as a service with a high security requirement such as payment, transfer and withdrawal, the service server may collect the digital certificate digest of the user from the request to conduct a verification to determine whether the service may be executed or not. For example, if the operation performed by the user is account transfer, the transfer server may collect the digital certificate digest of the user from the cookie contained in the transfer request transmitted by the browser 402 and verify the digital certificate digest.

The service server 406 may verify the digital certificate digest according to the following operations. A digest computation of the digital certificate of the user stored in the service server is performed by using the digest algorithm adopted to generate the digital certificate digest. A result from the digest computation is compared with the digital certificate digest. If they are the same, the verification is determined to pass. If there is a difference, the verification is determined to fail.

For example, if the algorithm adopted to generate the digital certificate digest of the user is the MD5, the digest computation is performed on the digital certificate by using the MD5 algorithm and then the result of the digest computation is compared with the digital certificate digest of the user obtained from the request. If they are the same, the verification is determined to passes. If there is a difference, the verification is determined to fail.

At 450, if the verification passes, the service server 406 executes the service. In other words, if the verification of the digital certificate passes, the service server 406 may execute the service corresponding to the operation performed by the user according to the service request transmitted by the browser 402. If the verification fails, a corresponding prompt message such as a verification failure prompt message may be returned to the browser.

Figure 1:
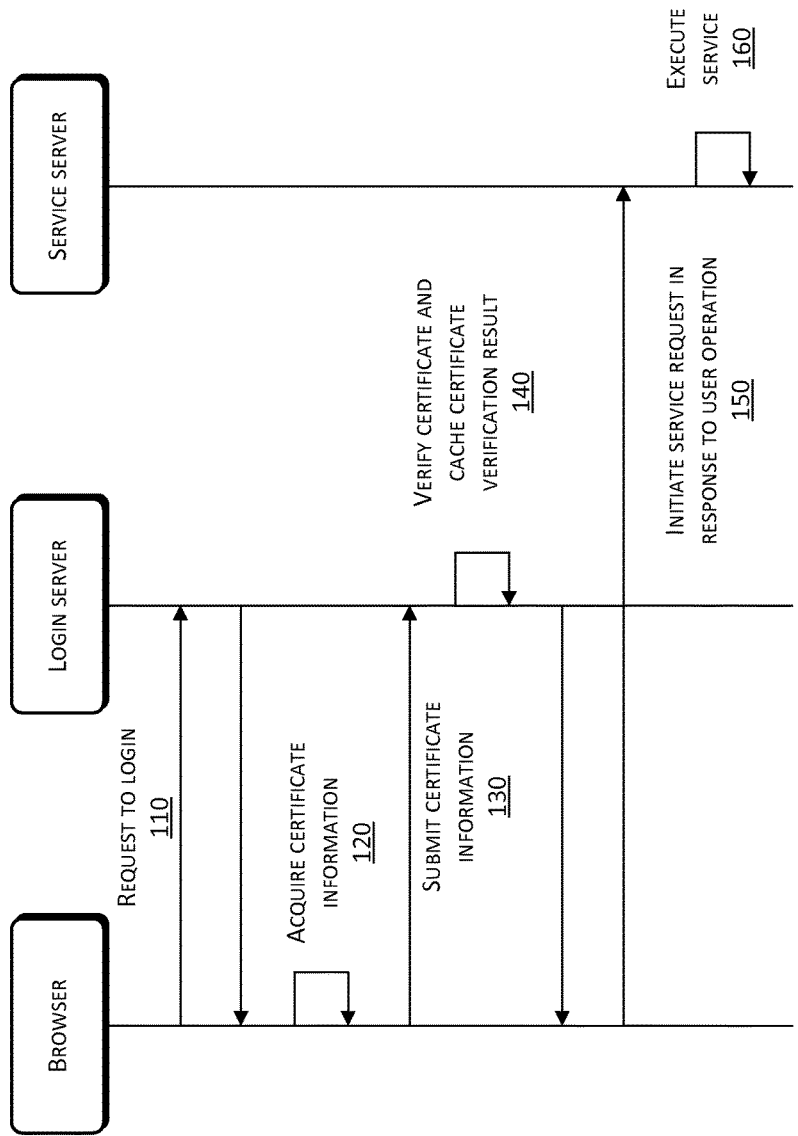
FIG. 1 is a schematic diagram of an interaction between a browser of a client terminal and a corresponding server under the existing digital certificate verification solution.

By comparing FIG. 4 with FIG. 1, under the techniques of the present disclosure, the browser on the client terminal only needs to collect the certificate, generate the certificate digest and cache the certificate digest, and does not need to submit the certificate information through a POST page, which reduces a number of requests sent to the server. The login server only needs to execute the login operation of the user and does not need to conduct operations such as verifying the certificate and caching the certificate verification result other than logging in.

Figure 5:
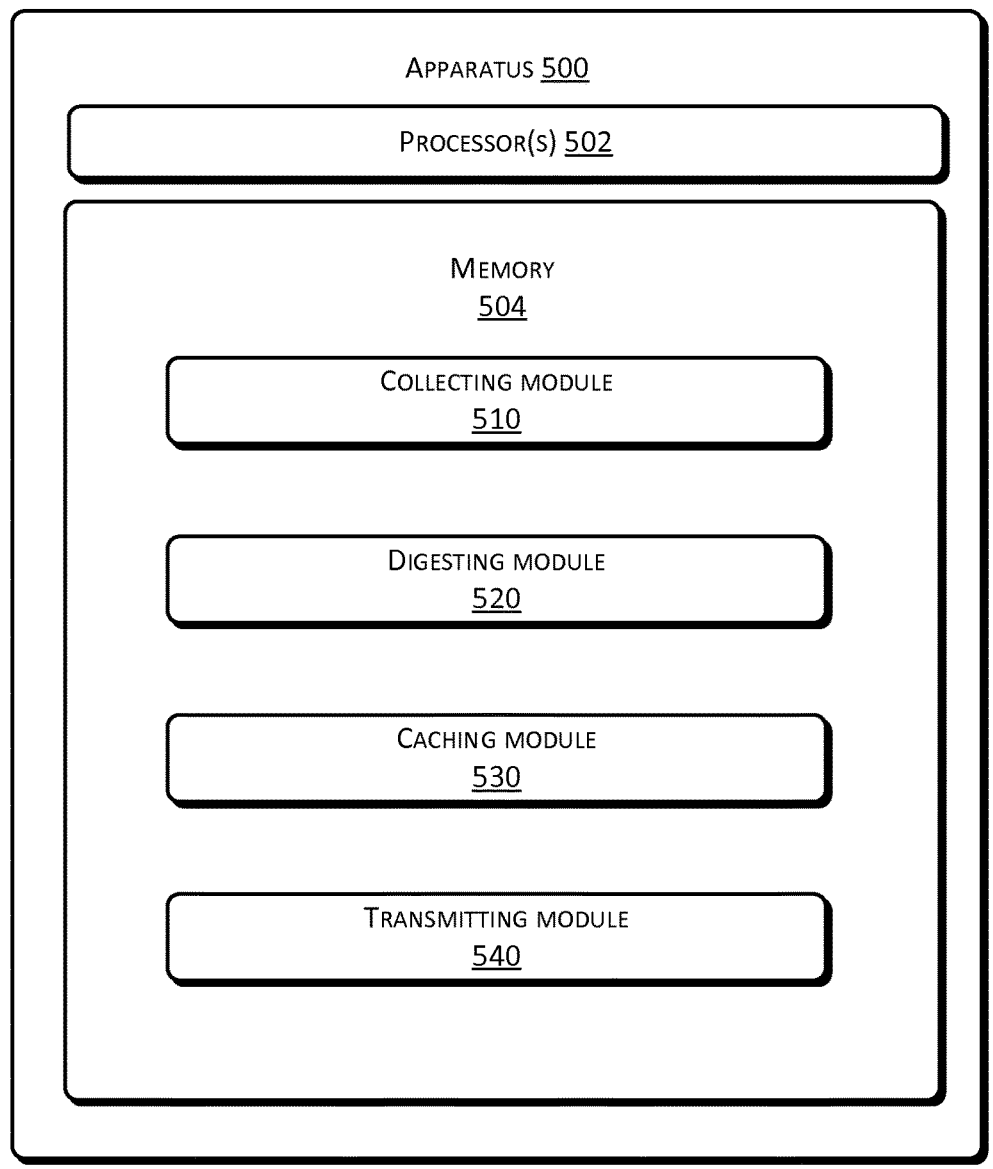
FIG. 5 is a structural diagram of an example apparatus for processing a digital certificate according to an example embodiment of the present disclosure.

FIG. 5 shows a structural diagram of an example apparatus 500 for processing a digital certificate according to an embodiment of the present disclosure. As shown in FIG. 5, the apparatus 500 may include one or more processor(s) or data processing unit(s) 502 and memory 504. The system 500 may further include one or more input/output devices and network interfaces (not shown in FIG. 5). The memory 504 is an example of computer readable media.

The memory 504 may store therein a plurality of modules or units including a collecting module 510, a digesting module 520, a caching module 530, and a transmitting module 540.

The collecting module 510 collects a digital certificate of a user. The digesting module 520 conducts a digest computation of a collecting result of the digital certificate to generate a digital certificate digest of the user. The caching module 530 caches the digital certificate digest. The transmitting module 540, in response to an operation of the user, transmits a service request containing the cached digital certificate digest to a service server, such that when a service corresponding to the service request is a service for which the digital certificate needs to be verified, the service server verifies the digital certificate digest and executes the service if the verification passes.

According to an example embodiment of the present disclosure, the transmitting module 540 may further transmit a login request to a login server when the user conducts a login operation. The login server and the service server may be the same server or may be different servers.

According to an example embodiment of the present disclosure, the collecting module 510 may further collect the digital certificate of the user when the user conducts the login operation. The caching module 530 may further cache the digital certificate digest in a cookie.

According to an example embodiment of the present disclosure, a digest algorithm adopted for conducting the digest computation on the collecting result of the digital certificate may include: MD5. The service server may further conduct a digest computation of the digital certificate of the user stored in the service server by using the digest algorithm adopted for generating the digital certificate digest, and compare a result collected by the digest computation with the digital certificate digest. If they are the same, the service server determines that the verification passes. If there is a difference, the service server determines that the verification of the digital certificate fails.

Figure 6:
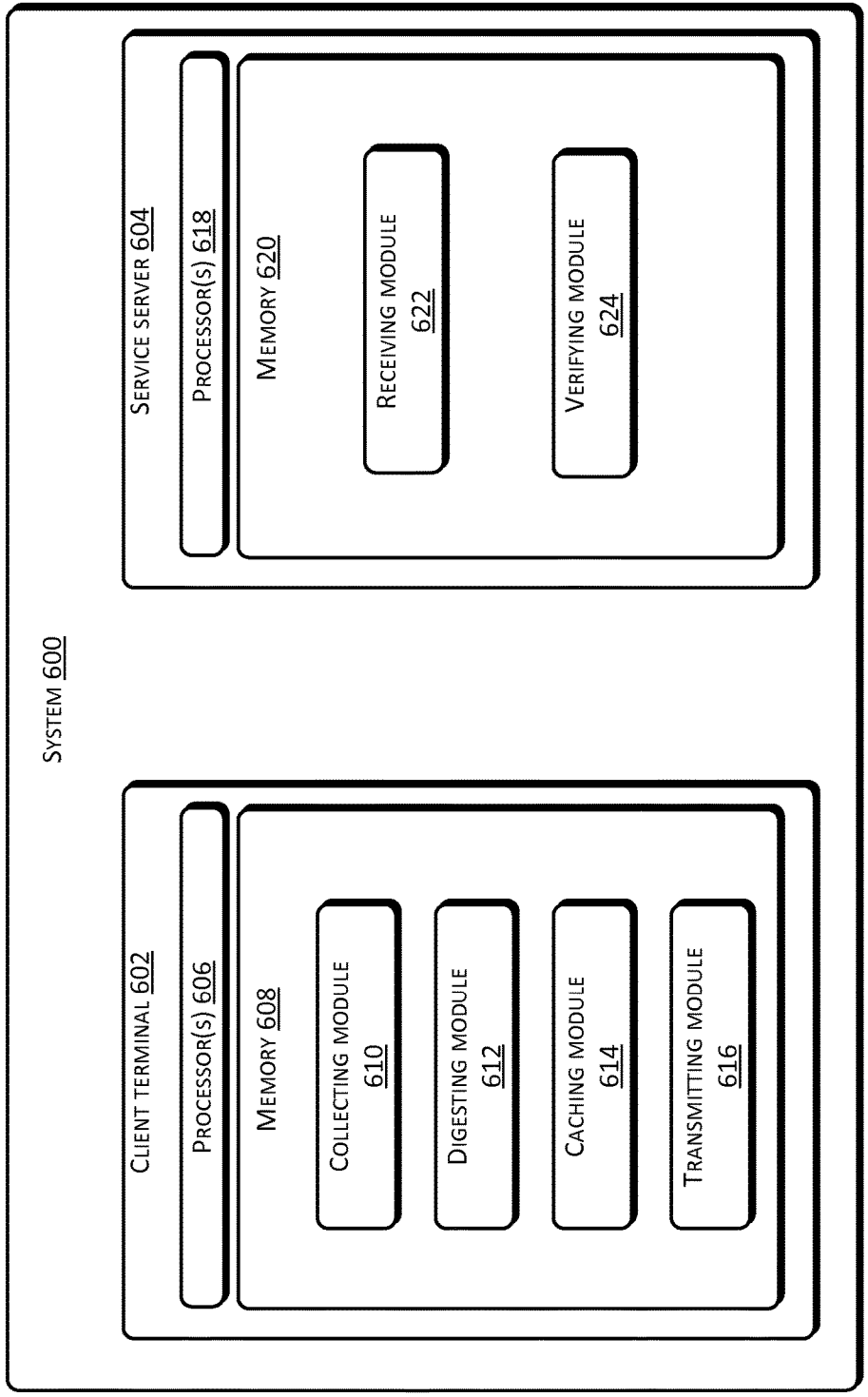
FIG. 6 is a structural diagram of an example system for verifying a digital certificate according to an embodiment of the present disclosure.

FIG. 6 illustrates a structural diagram of an example system 600 for verifying a digital certificate according to an embodiment of the present disclosure. As shown in FIG. 6, the system 600 may include a client terminal 602 and a service server 604.

The client terminal 602 may include one or more processor(s) or data processing unit(s) 606 and memory 608. The client terminal 602 may further include one or more input/output devices and network interfaces (not shown in FIG. 6). The memory 604 is an example of computer readable media. The memory 608 may store therein a plurality of modules or units including a collecting module 610, a digesting module 612, a caching module 614, and a transmitting module 616.

The collecting module 610 collects a digital certificate of a user. The digesting module 612 conducts a digest computation of a collecting result of the digital certificate to generate a digital certificate digest of the user. The caching module 614 caches the digital certificate digest. The transmitting module 616, in response to an operation of the user, transmits a service request containing the cached digital certificate digest to the service server.

The service server 604 may include one or more processor(s) or data processing unit(s) 618 and memory 620. The service server 604 may further include one or more input/output devices and network interfaces (not shown in FIG. 6). The memory 620 is an example of computer readable media. The memory 620 may store therein a plurality of modules or units including a receiving module 622 and a verifying module 624.

The receiving module 622 receives the service request. The verifying module 624, when a service corresponding to the service request is a service for which the digital certificate needs to be verified, verifies the digital certificate digest.

According to an embodiment of the present disclosure, the transmitting module 616 may further, when the user conducts a login operation, transmit a login request to a login server. The system 600 may further include the login server (not shown in FIG. 6) that receives the login request and executes the login operation of the user according to the login request.

According to an example embodiment of the present disclosure, the collecting module 610 may further collect the digital certificate of the user when the user conducts the login operation.

According to an example embodiment of the present disclosure, the service server 604 may further include an executing module (not shown in FIG. 6) to execute the service if the verification passes.

According to an example embodiment of the present disclosure, the verifying module 624 may further conduct a digest computation of the digital certificate of the user stored in the service server by using the digest algorithm adopted for generating the digital certificate digest, and compare a result collected by the digest computation with the digital certificate digest. If they are the same, the verifying module 624 determines that the verification passes; and if there is a difference, the verifying module 624 determines that the verification of the certificate fails.

Since the operations implemented by the apparatus in this embodiment substantially corresponds to those in the method embodiment as shown in FIG. 1 to FIG. 4. Thus, relevant descriptions in the above-mentioned apparatus embodiments may be referred to the method embodiments, which are not repetitively described here.

In a typical configuration, a computer device such as client terminal or server includes one or more processor(s) or central processing units (CPUs), I/O interfaces, network interfaces, and memory.

The memory may be computer readable media including a volatile memory, a Random Access Memory (RAM), and/or non-volatile memory, e.g., Read-Only Memory (ROM) or flash RAM, and so on. The memory is an example of a computer readable medium.

Computer readable media include permanent, nonpermanent, mobile and immobile media, which may implement information storage through any method or technologies. The information may be computer-readable or computer-executable instructions, data structures, program modules or other data. Examples of computer readable media include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other internal memory technologies, Compact Disk Read-Only Memories (CD-ROMs), Digital Versatile Discs (DVDs) or other optical memories, cassettes, cassette and disk memories or other magnetic memory devices or any other non-transmission media, which may be used for storing information which may be accessed by the computation device. According to the definitions herein, the computer readable media does not include transitory media such as a modulated data signal and a carrier wave.

It should also be noted that, the term "include" and variants thereof are intended to cover non-exclusive inclusion so that a process, a method, an article or a device including a series of elements not only includes these elements, but also includes other elements not explicitly listed, or further includes inherent elements of the process, the method, the article or the device. Without further limitation, an element as defined by a statement "including a . . . " is not exclusive of additional identical elements in the process, the method, the article or the device of the element.

Persons skilled in the art should understand that, the embodiments of the present disclosure may be provided as a method, a system, or a computer program product. Therefore, the present disclosure may be implemented as a hardware embodiment, a software embodiment, or an embodiment combing software and hardware. Moreover, the present disclosure may be in a form of a computer program product implemented on one or more computer readable media (including, but not limited to, a magnetic disk memory, a CD-ROM, an optical memory, and the like) including computer-executable instructions.

The above descriptions are merely embodiments of the present disclosure, and are not intended to limit the present disclosure. One of ordinary skill in the art understands that the present disclosure may have various modifications and variations. Any modification, equivalent replacement, improvement or the like made with the spirit and principle of the present disclosure should all belong to the scope of claims of the present disclosure.

The invention claimed is:

1. A method implemented by a client terminal, the method comprising:
   transmitting, by a browser of the client terminal, a login request to a login server for login using an account and a password;
   receiving, by the browser, webpage data returned from the login server after the account and the password are successfully verified, the webpage data including a script used for collection of a digital certificate;
   executing, by the browser, the script to collect a first digital certificate on the client terminal;
   collecting the first digital certificate when receiving a log-in request from a user of the client terminal;
   conducting, by the browser, a digest computation of a collecting result of the first digital certificate to generate a digital certificate digest of the first digital certificate;
   caching, by the browser, the digital certificate digest of the first digital certificate in a cookie file of the browser; and
   transmitting, by the browser, a service request and the cookie file containing the cached digital certificate digest to a service server in response to a user operation, wherein the service server determines whether a service corresponding to the service request is a service for which the first digital certificate needs to be verified; executes a service corresponding to the service request directly without verifying the cached digital certificate digest in response to the service corresponding to the service request being not a service for which the first digital certificate needs to be verified and the service server verifies the cached digital certificate digest in the cookie file with a second digital certificate stored in the service server in response to the service corresponding to the service request being the service for which the first digital certificate needs to be verified before the service corresponding to the service request is executed, and executes the service corresponding to the service request in response to a verification of the cached digital certificate digest being passed.

2. The method of claim 1, wherein the verifying comprises:
   conducting a digest computation to the second digital certificate stored in the service server by using a digest algorithm;
   comparing a result computed by the digest computation of the second digital certificate with the cached digital certificate digest of the first digital certificate; and
   determining that the verification is successful in response to determining that the result computed by the digest computation of the second digital certificate is same as the cached digital certificate digest of the first digital certificate.

3. The method of claim 2, wherein the digest algorithm comprises a Message-Digest Algorithm 5 (MD 5) algorithm.

4. The method of claim 1, wherein the login request is transmitted to the login server when receiving a request for logging into a website associated with the login server from the user of the client terminal, the login server is identical to or different from the service server.

5. A system comprising:
   a client terminal including:
   one or more processors;
   memory;
   a transmitting module stored in the memory and executable by the one or more processors that transmits a login request to a login server for login using an account and a password via a browser, wherein webpage data including a script used for collection of a digital certificate received from the login server after the account and the password are successfully verified;
   a collecting module stored in the memory and executable by the one or more processors that executes the script to collect a first digital certificate of a user on the client terminal via the browser, and collect the first digital certificate when receiving a log-in request from a user of the client terminal;

a digesting module stored in the memory and executable by the one or more processors that conducts a digest computation of a collecting result of the first digital certificate to generate a digital certificate digest of the first digital certificate;

a caching module stored in the memory and executable by the one or more processors that caches the digital certificate digest of the first digital certificate in a cookie file of the browser, wherein the transmitting module transmits a service request and the cookie file containing the cached digital certificate digest via the browser to a service server in response to an operation of the user, wherein the service server determines whether a service corresponding to the service request is a service for which the first digital certificate needs to be verified; executes the service corresponding to the service request directly without verifying the cached digital certificate digest of the first digital certificate in response to the service corresponding to the service request being not a service for which the first digital certificate needs to be verified; and verifies the cached the digital certificate digest of the first digital certificate in the cookie file with a second digital certificate stored in the service server in response to the service corresponding to the service request being the service for which the first digital certificate needs to be verified before the service corresponding to the service request is executed, and executes the service corresponding to the service request in response to a verification of the cached digital certificate digest being passed.

6. The system of claim 5, wherein the verifying module further:
   conducts a digest computation to the second digital certificate of the user stored in the service server by using a digest algorithm;
   compares a result computed by the digest computation of the second digital certificate with the cached digital certificate digest of the first digital certificate; and
   determines that the verification is successful in response to determining that the result computed by the digest computation of the second digital certificate is same as the cached digital certificate digest of the first digital certificate.

7. The system of claim 6, wherein the digest algorithm comprises a Message-Digest Algorithm 5 (MD 5) algorithm.

8. The system of claim 5, wherein the transmitting module transmits the login request to the login server when the client terminal receives the log-in request from the user, and the login server is identical to or different from the service server.

9. One or more non-transitory media having stored thereon computer-executable instructions executable by one or more processors to perform operations comprising:
   transmitting, by a browser of a client terminal, a login request to a login server for login using an account and a password;
   receiving, by the browser, webpage data returned from the login server after the account and the password are successfully verified, the webpage data including a script used for collection of a digital certificate;
   executing, by the browser, the script to collect a first digital certificate on the client terminal;
   collecting the first digital certificate when receiving a log-in request from a user of the client terminal;
   conducting, by the browser, a digest computation of a collecting result of the first digital certificate to generate a digital certificate digest of the first digital certificate;
   caching, by the browser, the digital certificate digest of the first digital certificate in a cookie file of the browser; and
   transmitting, by the browser, a service request and the cookie file containing the cached digital certificate digest to a service server in response to a user operation, wherein the service server determines whether a service corresponding to the service request is a service for which the first digital certificate needs to be verified; executes a service corresponding to the service request directly without verifying the cached digital certificate digest of the first digital certificate in response to the service corresponding to the service request being not a service for which the first digital certificate needs to be verified; and; verifies the cached digital certificate digest in the cookie file with a second digital certificate stored in the service server in response to the service corresponding to the service request being the service for which the first digital certificate needs to be verified before the service corresponding to the service request is executed, and executes the service corresponding to the service request in response to a verification of the cached digital certificate digest being passed.

* * * * *